May 9, 1961 R. WINKLER ET AL 2,983,201
METHOD OF AND APPARATUS FOR MAKING ENVELOPES
Filed Jan. 24, 1958 6 Sheets-Sheet 1
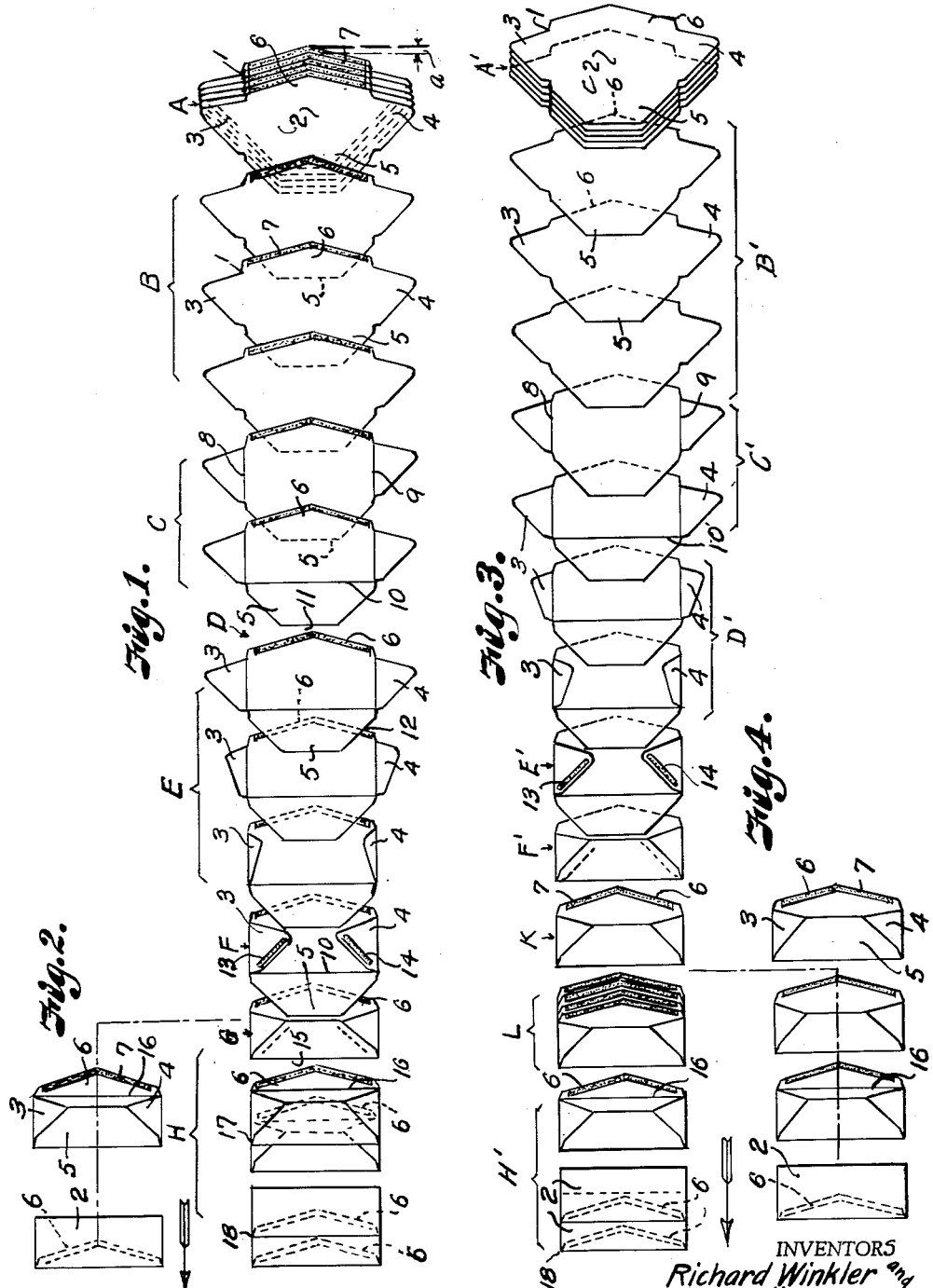
INVENTORS
Richard Winkler and
BY Kurt Dünnebier
Paul E. Mullendore
ATTORNEY

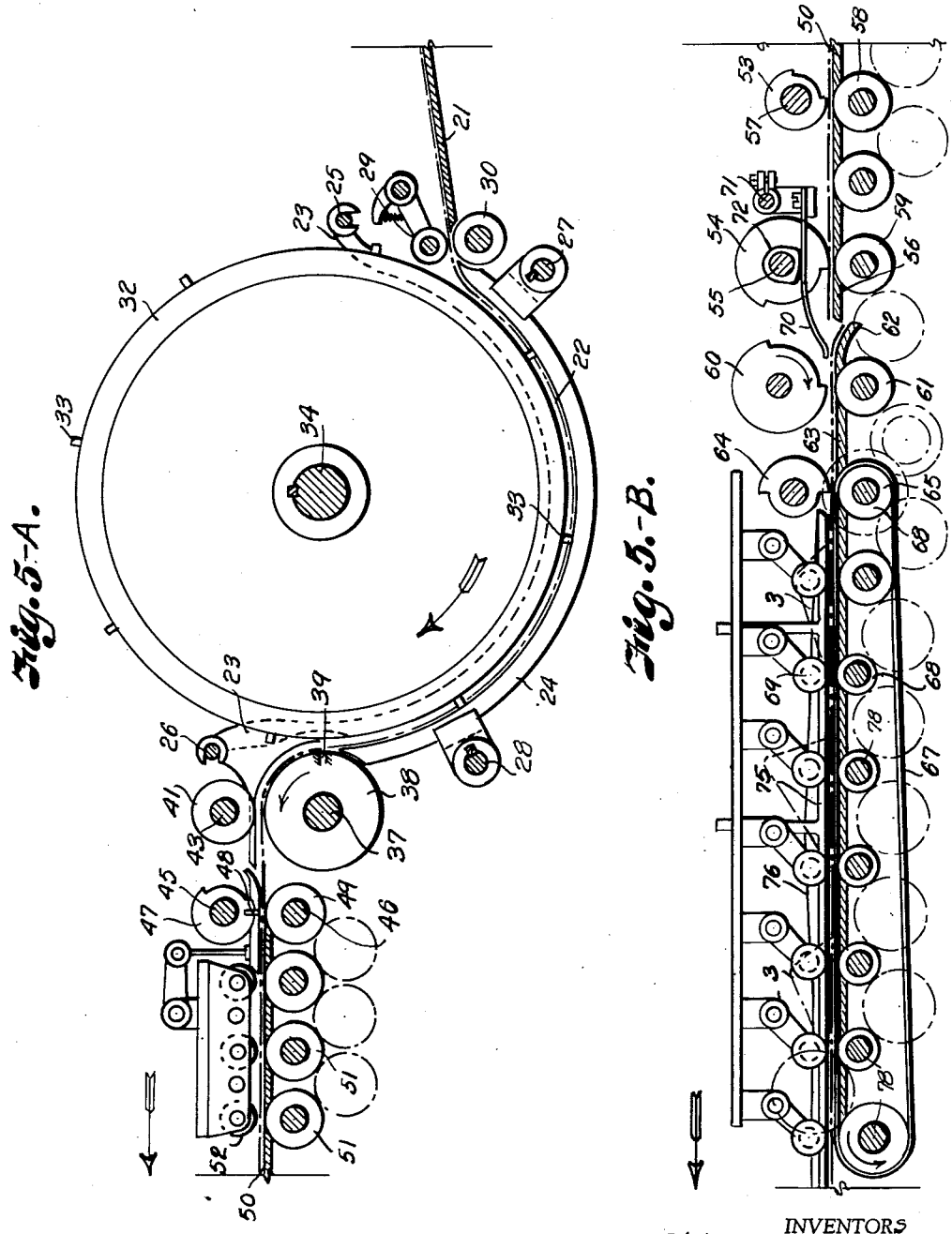

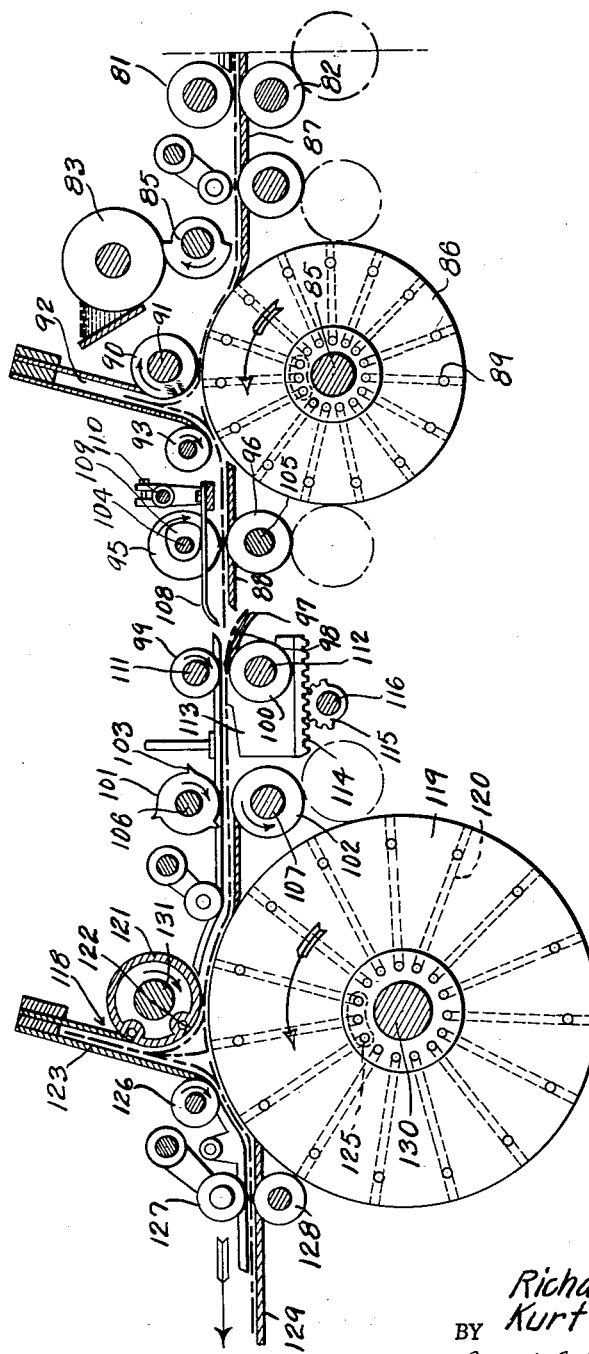

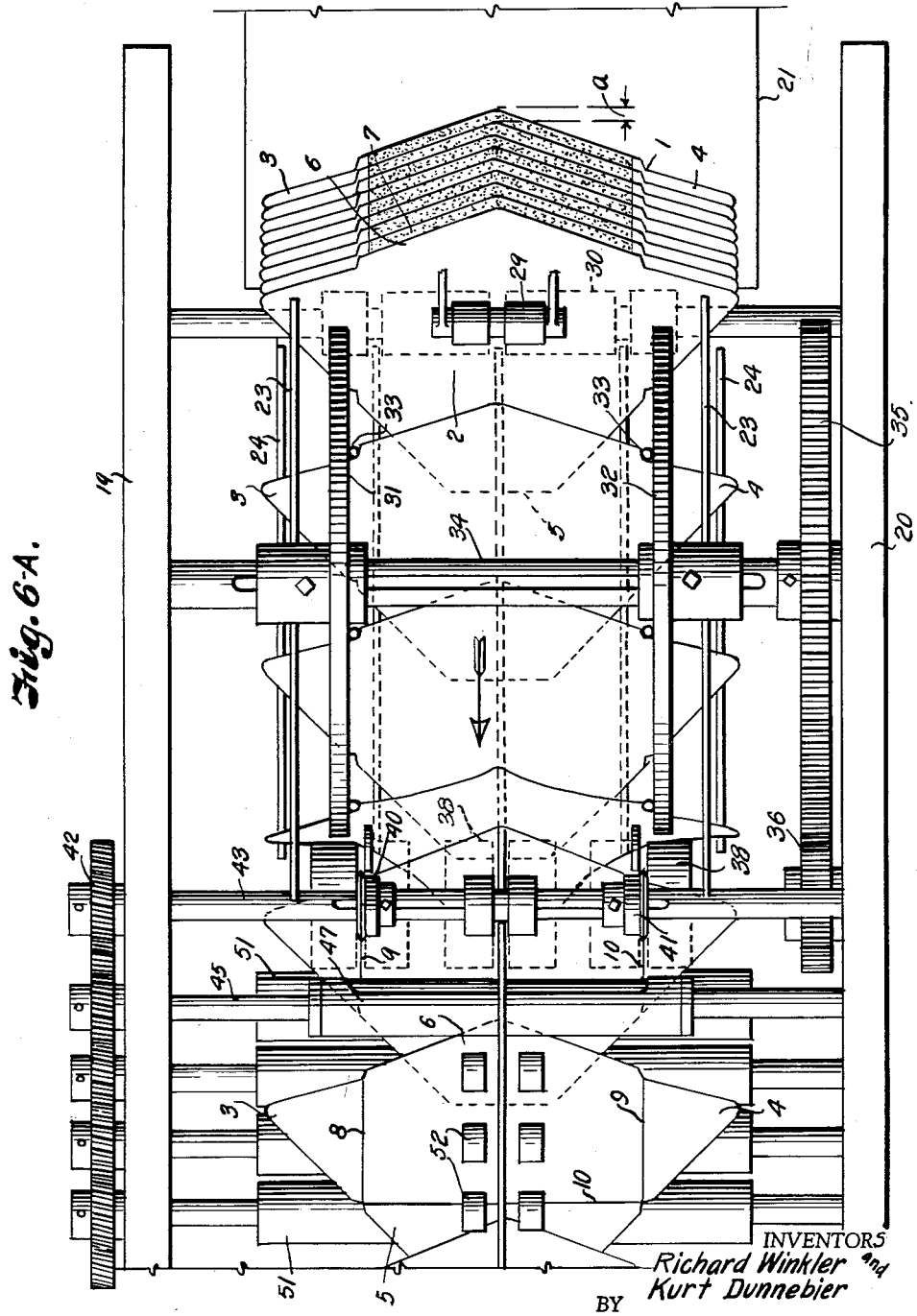

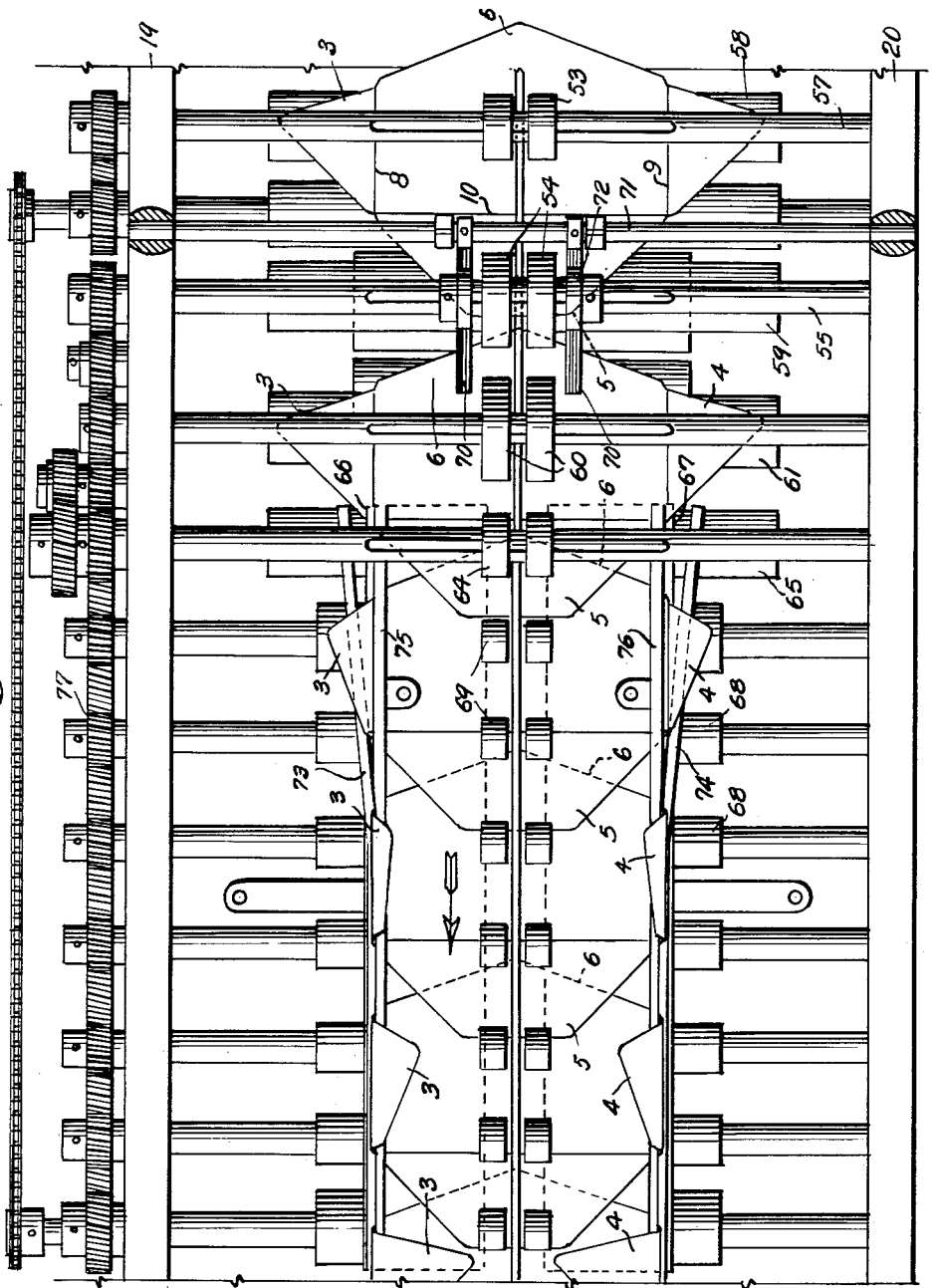

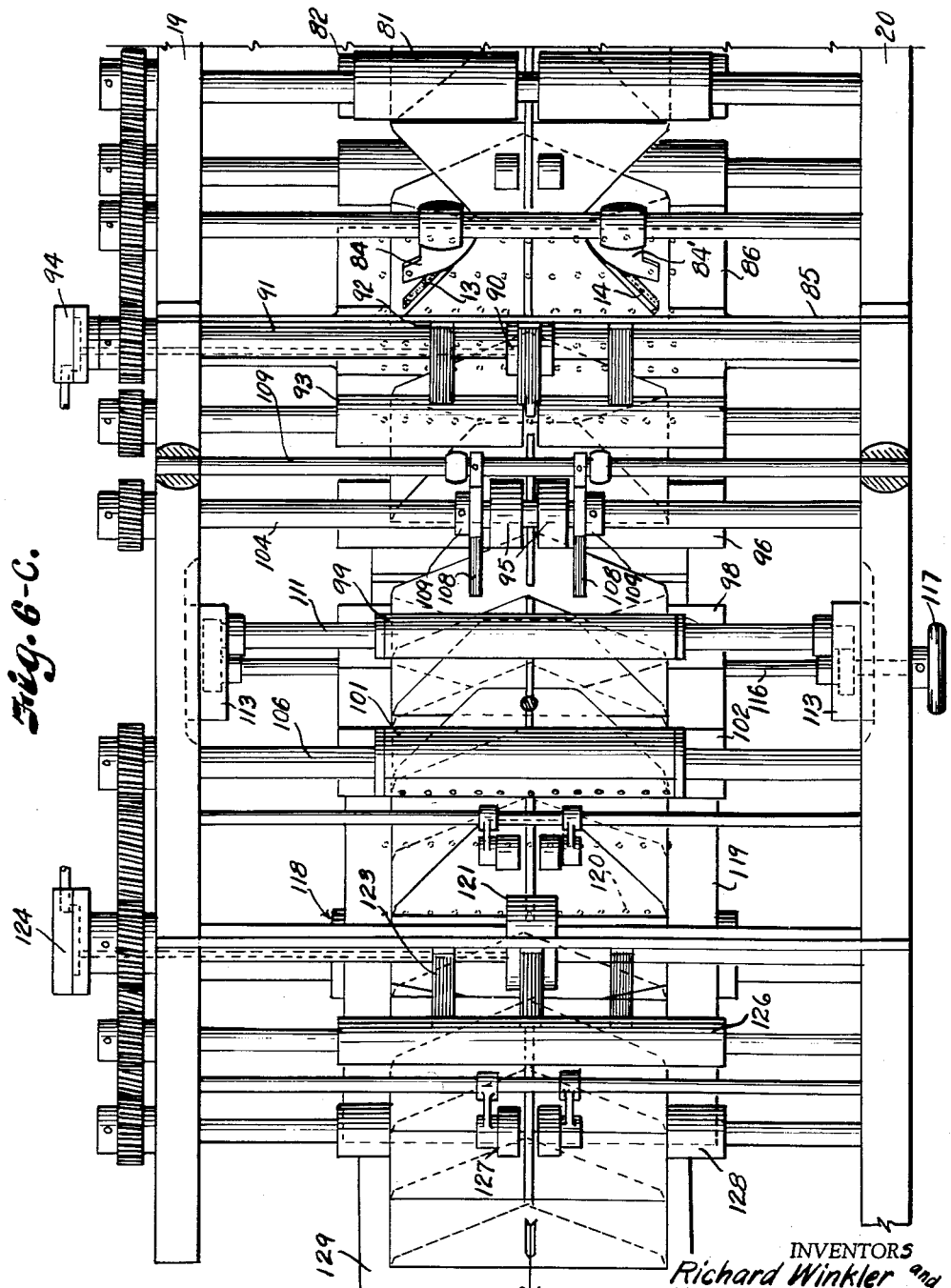

United States Patent Office 2,983,201
Patented May 9, 1961

2,983,201

METHOD OF AND APPARATUS FOR MAKING ENVELOPES

Richard Winkler, Rengsdorf near Neuwied, Rhineland-Pfalz, and Kurt Dünnebier, Wollendorf near Neuwied, Rhineland-Pfalz, Germany, assignors to Berkley Machine Company, Kansas City, Mo., a corporation of Missouri Filed Jan. 24, 1958, Ser. No. 710,952

Claims priority, application Germany Feb. 4, 1957

22 Claims. (Cl. 93—62)

This invention relates to a method of and apparatus for making envelopes, and has for its principal object to provide for the production of a greater quantity of envelopes in a unit of time than has heretofore been possible with present methods and equipment.

For example, in present machines the diameters of the work performing rollers are governed by the overall length of the envelope blanks to be operated upon as measured in the direction of their travel through the machine. Also, the envelope blanks that can be passed through the folding rollers of the machine are limited to a size and shape in which the closure flap of one envelope blank leaves a small clearance space from the end of the bottom flap of the next following blank, consequently, the output of such machines is comparatively small, as the work performing rollers can take only one blank at a time, although the speed of the machine and the individual working means would permit production of a greater number of envelopes for the same unit of time. Only in some exceptional cases is it possible for the blanks to slightly overlap each other, but in these cases, if the envelopes should overlap each other beyond the slight amount permissible, the bottom and closure flaps extend into the region of the creases to be formed, and it is impossible to produce the envelopes without the flaps thereof being marked or smudged.

With the above in view, it is a further object of the invention to also provide a novel method of stepping or staggering the blanks which will not interfere with the creasing, folding and gluing operations, and which results in closer relation of the blanks, so that more envelopes can be made in a given unit of time.

Another object of the invention is to provide a novel method of stepping or staggering the blanks in which the mutual distance of the blanks from one another substantially corresponds to the sum of the height of the envelope plus the height of the closure flap as related to the largest sized envelope to be produced.

In accomplishing these and other objects of the invention as hereinafter pointed out, we have provided an improved method and apparatus, as illustrated in the accompanying drawings, wherein:

Fig. 1 illustrates diagrammatically the successive steps involved in treating envelope blanks in accordance with the present invention, the closure flaps having been previously gummed.

Fig. 2 illustrates a slightly modified procedure of the form of method shown in Fig. 1.

Fig. 3 is a diagrammatic view showing the successive steps of a modified method in which the closure flaps of the envelopes have not been previously gummed.

Fig. 4 illustrates a slightly modified procedure in the method illustrated in Fig. 3.

Figs. 5-A, 5-B and 5-C together illustrate a longitudinal vertical section through the machine for carrying out the novel method in accordance with the present invention, the figures being somewhat diagrammatic and divided into the three sections "A," "B" and "C" because of the relative length of the machine.

Figs. 6-A, 6-B and 6-C together illustrate a plan view of the machine.

Referring more in detail to the drawings:

The methods illustrated in Figs. 1 to 4, inclusive, all start with the blanks 1 that are preshaped to provide a rectangular front side 2, side flaps or wings 3 and 4, a bottom or back flap 5, and a closure flap 6. In the method shown in Fig. 1, the closure flaps 6 have sealing gum 7 which has previously been applied thereto, otherwise the blanks may be the same in all the methods, and may be preformed in accordance with presently used methods, as the source of the blanks does not form a part of the present invention.

The novel method illustrated in Fig. 1 constitutes a plurality of steps designated by the letters A to H, inclusive, all of which are performed while the blanks are in continuous movement, with the blanks manipulated in accordance with the present invention for increasing the production in a given unit of time, or by which the surface speed of the envelopes and gum applicators can be reduced.

In practicing the method, the blanks are delivered from a gum applicating apparatus (not shown) to the station or step A in stepped, staggered or squamoid formation, with only the sealing gum areas 7 of the closure flaps 6 exposed, so that the blanks are closely gathered, as shown in Fig. 1, the spacing being indicated by the reference letter $a$ in Figs. 1 and 6-A. The blanks are advanced to the step or station "A" with the inner face sides uppermost and the bottom flaps 5 leading the closure flaps 6, with the sealing gum 7 facing upwardly. After being brought into position at the station or step A, the prelapped blanks are successively drawn out, to an extent substantially equal to the sum of the maximum height of the finished envelope plus the maximum height of the closure flap 6. However, the bottom flap 5 and closure flap 6 of adjacent blanks remain interlapped with the closure flap 6 of a preceding blank overlying the bottom flap 5 of the immediately following envelope as they are moved through the station B. The front side portion 2 and side flaps 3 and 4 are now singularly exposed and advanced to the station C to crease the juncture of the side flaps 3 and 4 with the front side of the envelope, as indicated at 8 and 9, and to transversely crease the juncture of the bottom flap 5 with the front side 2, as indicated at 10. Since the bottom flap 5 of a succeeding or following blank is lapping the outside face of the blank, it becomes desirable to again rearrange the blanks, so as to place the bottom flap 5 of the succeeding or following blank over the closure flap 6 of a preceding blank to an extent, so that the bottom flap of a succeeding or following blank does not interfere with folding over the side flaps 3 and 4, which operation is carried on as the blanks are moving through the station E. This is effected at station D by drawing a foremost blank at a higher speed from lapping relation with the following blank to an extent whereby the bottom flap 5 of the following blank is clear of the closure flap 6 of the preceding blank, as indicated at 11. After the preceding blank is slowed to its original speed and the trailing closure flap 6 thereof is deflected downwardly and the succeeding blank is speeded up, the bottom flap 5 thereof passes freely over the turned down closure flap 6 of the preceding blank, as indicated at 12. During this shifting of the blanks, the bottom flap 5 rides over the gummed area 7 of the closure flap 6 and is stopped sufficiently short to be cleared by the side flaps 3 and 4 as the side flaps 3 and 4 are turned inwardly during movement through the station E. Thus, the same relative overlap maintains the same relative relation of the blanks while the side flaps are folded on the crease lines 8 and 9 over the inner face of the front side portion 2 of an envelope blank. In the succeeding station F, the completely folded side flaps are supplied with stripes of gum 13 and 14 along the forward marginal edges thereof. On reaching station G, the bottom flap is folded on the line 10, as indicated at 15, into contact with the adhesive and pressed down to make the seals for securing the bottom and side flaps together. An envelope is now substantially completed, with the exception of scoring and folding the closure flap 6. The bottom flap of the next succeeding envelope overlies the closure flap of the folded envelope, and in moving to the station H the envelope is registered for application of a score or crease line 16 across the closure flap 6 and speeded up to effect withdrawal of the closure flap 6 thereof from under the bottom flap of the succeeding blank, then in station F. The closure flap on a preceding envelope is pulled down so that the folded edge 15 of a preceding envelope slides freely thereover to lap the envelopes, as shown at 17. The foremost envelope is then picked from under the overlapped envelope, the closure flap folded, and the envelope is bodily reversed and relapped as indicated at 18, to facilitate stacking thereof for boxing. The turning of the finished envelopes is important because the folded closure flaps 6 do not interfere with their continued forward movement to the boxing station, not shown.

In the modification shown in Fig. 2, the envelopes are separated on withdrawal from the station G, then scored and inverted without relapping thereof, the envelopes being carried away individually in spaced apart relation to a boxing station.

In the method shown in Fig. 3, the envelopes are delivered to the station A' in stepped, staggered or squamoid relation, as in the previous method, however, the blanks are staggered reversely to position the bottom flap 5 of the lowermost blank in position to be drawn into the station B', where the blanks are separated, with the closure flap 6 of a preceding blank 1 underlapping the bottom flap of a following blank. In this way the blanks are separated for scoring the side and bottom flaps 3, 4 and 5 at the station C', as indicated at 8, 9 and 10, and it is not necessary to change the overlapping relationship of the flaps 5 and 6 in the manner described in the first method, because the bottom flaps 5 are already in the proper position for passing through the station D'. On passing through the station D', the side flaps 3 and 4 may be folded over on the creases 8 and 9. After folding over the side flaps 3 and 4, the blanks continue their advance to the station E', where the gum stripes 13 and 14 are applied to the forward marginal edges of the side flaps, and thence on to the station F', where the bottom flap 5 is turned over the side flaps 3 and 4 to effect a seal with the gum stripes 13 and 14 applied at the station E'. Folding the bottom flap portion uncovers the closure flap of a preceding blank and leaves space between the blanks during their movement to a station K, where the sealing flaps 6 are provided with a sealing gum 7, and then moved into lapped relation for travel through a drying station L'. After passing through the drying station, the envelopes are reseparated and the closure flaps 6 are provided with scores 16 after which the closure flaps 6 of the envelopes are simultaneously closed and the envelopes inverted at the station H', in exactly the same manner as described in the first described method.

If desired, the gumming of the closure flaps of the single envelopes at station K may be omitted, and the gum applied after the envelopes have been lapped as shown in station L to expose only the portion of the closure flaps to which the gum is to be applied. The gum may be applied by means of a brush or roller, after which the envelopes are slightly separated while the gum is drying. The envelopes then continue through the station H'.

The modification illustrated in Fig. 4 differs from the method of Fig. 3 merely in that after folding the bottom flaps 5, the envelopes are aligned and creased as at 16, but they are not relapped for the remainder of their travel.

The above described methods may be best carried out in a machine as illustrated in Figs. 5-A to C and Figs. 6-A to C, and it is, therefore, an object of the invention to provide a simple and compact machine in which the steps of the above described methods may be performed.

Therefore, the invention also contemplates a machine which includes spaced apart side frames 19 and 20 for carrying the operating mechanisms at the different stations and for journaling the shafts of the various feed rollers and cylinders therein, as now to be described.

Carried between the side frames at one end thereof is an inclined support 21 on which the envelopes 1 are moved from the closure flap gumming machine (not shown) in stepped, staggered or squamoid formation to the station A, wherein the blanks are adjusted as to their lapped relation for travel into the machine through an arcuate pass 22 that is formed between upper and lower guide rails 23 and 24. The guide rails are supported on transverse rods 25—26 and 27—28 (Fig. 5-A) that are suitably carried from the side frames 19 and 20. The envelopes are withdrawn in sequential order from the support 21 by upper pressure rollers 29 and lower feed rollers 30 that are located respectively above and below the delivery end of the support 21. The envelopes are drawn apart a distance substantially equal to the sum of the maximum height of the finished envelope plus the maximum height of its closure flap and moved, in accordance with such spacing, through the pass 22 under action of a pair of space regulating disks 31 and 32 which rotate in the direction of the arrow, Fig. 5-A. The disks 31 and 32 have radially extending spaced apart pins 33 projecting from the periphery thereof for engaging rear edges of the side flaps 3 and 4 immediately adjacent the ends of the closure flaps 6, the pins being spaced on the periphery of the disks according to the desired spacing of the blanks, which, as stated, is substantially the height of the finished envelope plus the height of the closure flap. The regulating disks 31 and 32 are adjustably mounted on a shaft 34 which is journaled in the side frames and carries a gear 35 which meshes with a driving gear 36, as best shown in Fig. 6-A. Mounted on a transverse shaft 37 at the discharge end of the pass 22 are feed rollers 38, the center rollers of which are provided with vacuum ports 39 (Fig. 5-A) wherethrough a vacuum is established to effect engagement of the under face of the bottom flap 5 of the blanks as the blanks emerge from the pass to carry the seized blank under creasing rollers 40 and 41 whereby the creases 9 and 10 are applied at the juncture of the side flaps 3 and 4 with the ends of the body portion 2 of the envelope blanks. The shaft 37 is driven from a train of gears 42 (Fig. 6-A). The creasing rollers are mounted on a transverse shaft 43 that is journaled in the side frames. Also positioned between the side frames and carried by upper and lower transverse shafts 45 and 46 is an upper creasing roller 47 having a longitudinal creasing blade 48 and a lower roller 49 between which the blanks pass for applying the transverse crease 10. The latter creasing rollers are also driven from the chain of gears 42, whereby they are operated in timed relation with movement of the blanks by the regulating disks 31 and 32.

The blanks are now guided upon conveying means, including a supporting plate 50 (Fig. 5-A) having spaced openings through which the peripheries of a series of feed rollers 51 operate in conjunction with a series of upper pressure rollers 52 to continue advance of the blanks through the station C of the machine.

In order to rearrange and realign the blanks as above described, so as to place the bottom flap 5 in a position below the closure flap 6 of a preceding blank, the machine is provided with an auxiliary segment roller 53 followed by a segment roller 54 of larger diameter that is spaced therefrom. The segment roller 54 is carried on a transverse shaft 55 above the terminal 56 of the supporting plate 50. The segment roller 53 is on a shaft 57 and operates with a lower feed roller 58 to continue advance of the blanks at the speed of the feed rollers 51 to maintain the spacing of the blanks as shown in Fig. 6–A, however, when segment roller 53 (Figs. 5–B and 6–B) releases its grip on a blank, the grip thereon is taken up and continued by the segment roller 54 and a cooperating lower roller 59 to move the blank at a higher speed and effect the separation of the foremost blank from the following blank.

The blank, after having been drawn out by the segment roller 54, is seized by another segment roller 60 and a lower roller 61 that are located, respectively, above and below the downturned end 62 of a supporting plate 63 that forms a continuation for support of the blanks (Fig. 5–B). The segment roller 60 continues the advance of the drawn out blank at the speed of the segment roller 54 and passes it to another and smaller segment roller 64 which cooperates with a lower roller 65 to advance the blank onto belts 66 and 67 which are carried on lower rollers 68 and cooperate with upper pressure rollers 69 to advance the blanks at the same speed as the blanks were advanced by the feed rollers 51 in the section "B" of the machine (Figs. 5–A and 6–B). The blanks are thus relapped by the action of the segment rollers 60 and 64 and to facilitate relapping of the blanks, the machine is provided with leaf springs 70 that are carried on a transverse shaft 71 and have their lower ends adapted to press the flaps 6 against the end 62 of the plate 63 under action of cams 72 that are fixed to the shaft 55 for the segment roller 54. Thus when the closure flap 6 of a blank passes over the terminal end 56 of the plate 50, the cams 72 come into action to cause the springs to bend the closure flaps 6 downwardly and to permit the bottom flap 5 of a succeeding blank to slide thereover and upon the inner face of the preceding blank. After the cams 72 have passed the point where they exert action on the leaf springs, the leaf springs move upwardly and the succeeding blank readily passes thereunder. This happens just as the speeded up blank has been released by the segment roller 60 and the preceding blank is being moved at its previous speed onto the belts 66 and 67.

Located along the outer sides of the belts 66 and 67 are guides 73 and 74 and folding rails 75 and 76 that cooperate to fold the side flaps 3 and 4 upwardly and over the folding rails 75 and 76 while the center portions of the envelopes are being pressed to the belts by pressure rollers 69. The portions of the belts acted upon by the pressure rollers 69 are backed by a series of forwarding rollers 68, the forwarding rollers being operated in timed relation with the other rollers of the machine by connection with a chain of gears 77 which actuate the shafts 78 of the various rollers (Fig. 6–B).

Following the folding section E, the machine includes upper and lower feed rollers 81 and 82 (Figs. 5–C and 6–C) which act to press the folds of the side flaps 3 and 4 and bring the side flaps into contact with the body portions 2 of the blanks. Also included in this section of the machine and supported above the path of the blanks is a gum applicator 83 which supplies gum to applicators 84 and 84' to apply the gum stripes 13 and 14 to the forward marginal edges of the side flaps 3 and 4. Mounted on a transverse shaft 85 at the under side of the path of the blanks is a suction roller 86 that is positioned between supports 87 and 88 for continuing movement of the blanks and which is provided with ducts 89 (Fig. 5–C) through which vacuum is drawn in timed relation with movement of the blanks. Cooperating with the suction roller 86 is an upper suction roller 90 that is carried on a shaft 91 directly above the shaft 85 and to the rear of a pocket 92 (Fig. 5–C). Positioned at the forward side of the pocket 92 is an upper roller 93 which cooperates with the suction rollers and the pocket to effect folding of the bottom flap 5 of a blank on the crease line 10. This is effected because the suction roller 90 seizes the bottom flap 5 and carries it upwardly within the pocket 92, after which one row of suction ports 89 in the suction roller 86 engages the body portion 2 of the blank just to the rear of the crease line 10 to move that portion of the blank forwardly and bend the blank at the crease line. The suction to the suction roller 90 is then cut off by a suitable valve mechanism 94. By this time the bend of the envelope is engaged under the roller 93, the fold is flattened, and as the blank is continued to be advanced thereby, the bottom flap is now in contact with the sealing stripes 13 and 14.

Following the folding mechanism, the machine includes upper and lower feed rollers 95 and 96 that continue the movement of the blank across the supporting plate 88 and over the downturned end 97 of the supporting plate 98. Located at the respective upper and lower sides of the supporting plate 98 forwardly of the downturned portion thereof are upper and lower rollers 99 and 100, to continue feed of the blank between upper and lower rollers 101 and 102, the upper of which has radially extending abutments 103 adapted to engage the folded edge of the blank to momentarily stop the blank and thereby register the blank preparatory to application of the transverse crease 16 for the closure flap. The rollers 95 and 96 are carried on the transverse shafts 104 and 105 that are journaled in the side frames. The rollers 101 and 102 are on shafts 106 and 107 and operate at a reduced speed relatively to the feed rollers 95 and 96, so that the following blank is overlapped with the sealing flap of the preceding blank then being registered. While a blank is being held in registry by the stops 103, spring leaves 108 are moved in contact with the closure flap 6 of the registered blank to move the closure flap downwardly over the downturned end 97 of the supporting plate 98, the spring leaves being mechanically operated in timed relation by cams 109 that are fixed to the shaft 104 carrying the feed roller 95. The spring leaves 108 are pivotally mounted on a transverse shaft 110 in the same manner as the spring leaves previously described. By the time the forward edge of a following blank reaches the spring leaves, the cam moves out of position and the spring leaves are raised to permit the following blank to slide over the downturned flap of the registered blank.

In order to adjust the point of the crease 16, the shafts 111 and 112 for the creasing rollers 99 and 100 are carried by slide blocks 113 having racks 114 which mesh with segment gears 115 (Fig. 5–C) on a shaft 116, the shaft 116 being provided with a hand wheel 117 (Fig. 6–C).

After registration and lapping of the following blank, the blanks continue to where they are acted upon by a closure flap and envelope inverting mechanism 118 which also forms a part of the machine. This mechanism includes a lower suction wheel 119 having suction ports 120 which cooperate with an upper suction roller 121, also having suction ports 122. The suction through the ports 122 attract the envelopes above their bottom edges and direct them into an upright pocket 123, after which the suction is shut off through a suitable valve mechanism 124 (Fig. 6–C) and a port in the suction roller 120 becomes effective through a similar valve mechanism 125 (Fig. 5–C) to attract the closure flap to the periphery of the suction wheel 119 and to continue forward movement thereof to effect folding of the flap on the crease 16 and to carry the fold under a pressure roller 126 which flattens the closure flap against the body of the envelope. At this point the vacuum is shut off and continued movement of the vacuum roller and the pressure roller withdraws the envelope from the pocket and feeds it between feed rollers 127 and 128 to carry the envelopes into lapping relation on a support 129. The vacuum rollers 119 and 121 are carried on transverse shafts 130 and 131.

The apparatus for practicing the method of Fig. 3 is the same as above described, except the mechanism for changing the position of the bottom flap portions relatively to the closure flaps is omitted, and a standard closure flap gumming mechanism is substituted therefor for applying the gum to the closure flap portions of the blanks.

It is obvious that the present invention provides a method and apparatus for the production of envelopes whereby a greater quantity of envelopes can be produced in a unit of time, since the aligning, creasing, folding, and gumming operations are carried on with the envelope blanks in lapped relation, and that the lapping of the blanks is manipulated so as not to interfere with the aligning, creasing, folding, gumming, or other operations being carried out on any one of the blanks.

What we claim and desire to secure by Letters Patent is:

1. A method of making envelopes from blanks having side, bottom and closure flap portions extending from a body portion of the blanks, said method including moving the blanks in consecutive order in stepped relation with the bottom flap portion of a succeeding blank lapping the closure flap portion of a preceding blank, folding the side flap portions over the body portion of one of the envelope blanks while maintaining said lapped relation with the preceding and succeeding blanks, folding and sealing the bottom flap portion of said one blank to the side flap portions while maintaining the bottom flap portion of the succeeding blank in overlying relation with the closure flap portion of said one blank, lapping said folded portion of said one blank with the closure flap portion of a preceding folded blank to expose the closure flap portion of said one blank from the bottom flap portion of said succeeding blank, and creasing said exposed closure flap portion.

2. A method of making envelopes from blanks having side, bottom and closure flap portions extending from a body portion of the blanks, said method including moving the blanks in consecutive order in stepped relation with the bottom flap portion of a succeeding blank lapping the closure flap portion of a preceding blank, creasing the side flap and bottom flap portions while maintaining said lapped relation, folding the side flap portions on said creases over the body portion of one of the envelope blanks while maintaining said lapped relation with the preceding and succeeding blanks, applying adhesive to the folded over side flap portions, folding the bottom flap portion of said one blank on the crease thereof over the side flap portions and effecting a seal thereof while maintaining the bottom flap portion of the succeeding blank in overlying relation with the closure flap portion of said one blank, lapping said folded portion of said one blank with the closure flap portion of a preceding folded blank to separate the closure flap portion of said one blank from the bottom flap portion of said succeeding blank, and creasing said closure flap portion.

3. A method of making envelopes from blanks having side, bottom and closure flap portions extending from a body portion of the blanks, said method including moving the blanks in consecutive order in stepped relation with the bottom flap portion of a succeeding blank lapping the closure flap portion of a preceding blank, creasing the side flap and bottom flap portions while maintaining said lapped relation, folding the side flap portions on said creases over the body portion of one of the envelope blanks while maintaining said lapped relation with the preceding and succeeding blanks, applying adhesive to the folded over side flap portions, folding the bottom flap portion of said one blank on the crease thereof over the side flap portions and effecting a seal thereof while maintaining the bottom flap portion of the succeeding blank in overlying relation with the closure flap portion of said one blank, lapping said folded portion of said one blank with the closure flap portion of a preceding folded blank to separate the closure flap portion of said one blank from the bottom flap portion of said succeeding blank, creasing said closure flap portion, folding the closure flap on said crease, and turning over the envelopes.

4. A method of making envelopes from blanks having side, bottom and closure flap portions extending from a body portion of the blanks, said method including moving the blanks in consecutive order in stepped relation with the bottom flap portion of a succeeding blank lapping the closure flap portion of a preceding blank, creasing the side flap and bottom flap portions while maintaining said lapped relation, folding the side flap portions on said creases over the body portion of one of the envelope blanks while maintaining said lapped relation with the preceding and succeeding blanks, applying adhesive to the folded over side flap portions, folding the bottom flap portion of said one blank on the crease thereof over the side flap portions and effecting a seal thereof while maintaining the bottom flap portion of the succeeding blank in overlying relation with the closure flap portion of said one blank, lapping said folded portion of said one blank with the closure flap portion of a preceding folded blank to separate the closure flap portion of said one blank from the bottom flap portion of said succeeding blank, creasing said closure flap portion of the said preceding folded blank to complete formation of an envelope, reversing position of the preceding folded envelope while folding said closure flap portion thereof, and overlapping the reversed envelopes for continuing advancement of the envelopes overlapped with the folded edge of the closure flaps foremost.

5. A method of making envelopes from blanks having faces to constitute the inside faces of the completed envelopes, having side, bottom and closure flap portions extending from a body portion of the blanks, said method including moving the blanks in stepped relation one upon another, withdrawing the blanks one at a time from said stepped relation at a rate to maintain the bottom flap portion of a succeeding blank in lapping contact with the closure flap portion on the inside face of a preceding blank, folding the side flap portions over the body portion and against the inside face of said preceding envelope blank while maintaining said lapped relation with the said preceding and succeeding blanks, applying adhesive to the folded over side flap portions, folding the bottom flap portion of the said preceding blank over the side flap portions thereof and effecting a seal of the bottom flap portion while maintaining the bottom flap portion of the succeeding blank in overlying relation with the closure flap portion of the said preceding blank to uncover the closure flap of the next preceding blank, creasing said exposed closure flap portion of the said next preceding blank, and folding said creased flap portion of the said next preceding blank.

6. A method of making envelopes from blanks having side, bottom and closure flap portions extending from a body portion of the blanks, said method including moving the blanks in stepped relation one upon another, withdrawing the blanks one at a time from said stepped relation at a rate to maintain the bottom flap portion of a succeeding blank in lapping relation with the closure flap portion of a preceding blank, folding the side flap portions over the body portion of one of the envelope blanks while maintaining said lapped relation with the preceding and succeeding blanks, applying adhesive to the folded over side flap portions, folding the bottom flap portion of said one blank over the side flap portions and effecting a seal thereof while maintaining the bottom flap portion of the succeeding blank in overlying relation with the closure flap portion of said one blank, lapping said folded portion of said one blank with the closure flap portion of a preceding folded blank to expose the closure flap portion of said one blank from the bottom flap portion of said succeeding blank, creasing said exposed closure flap portion, and folding said creased flap portion.

7. A method of making envelopes from blanks having side, bottom and closure flap portions extending from a body portion of the blanks and having gum on said closure flap portions, said method including moving the blanks in stepped relation while maintaining the bottom flap portion of a succeeding blank in underlapping relation with the closure flap portion of a preceding blank, creasing the side and bottom flaps while maintaining said lapping relation, withdrawing the closure flap of the preceding envelope blank from under the bottom flap of the succeeding blank, readjusting the succeeding blank with the bottom flap thereof overlying the closure flap of the preceding blank, folding the side flap portions over the body portion of said preceding blank, applying adhesive to the folded over side flap portions, and folding the bottom flap portion of said preceding blank over the side flap portions and effecting a seal thereof while maintaining the bottom flap portion of the succeeding blank in overlying relation with the closure flap portion of said preceding blank.

8. A method of making envelopes from blanks having side, bottom and closure flap portions extending from a body portion of the blanks and having gum on said closure flap portions, said method including moving the blanks in stepped relation while maintaining the bottom flap portion of a succeeding blank in underlapping relation with the closure flap portion of a preceding blank, creasing the side and bottom flaps while maintaining said lapping relation, withdrawing the closure flap of the preceding envelope blank from under the bottom flap of the succeeding blank, readjusting the succeeding blank with the bottom flap thereof overlying the closure flap of the preceding blank, folding the side flap portions over the body portion of said preceding blank, applying adhesive to the folded over side flap portions, folding the bottom flap portion of said preceding blank over the side flap portions and effecting a seal thereof while maintaining the bottom flap portion of the succeeding blank in overlying relation with the closure flap portion of said preceding blank, creasing the closure flap of said preceding blank, and simultaneously folding the closure flap to complete the formation of the envelope while reversing the position of the envelope.

9. A method of making envelopes from blanks having one face side to constitute the inside faces of the completed envelopes and having side, bottom and pregummed closure flap portions extending from a body portion of the blanks with the gum of the closure flap on said one face side of the blanks, said method including moving the blanks in stepped relation one upon another, withdrawing the blanks one at a time from said stepped relation at a rate to maintain the bottom flap portion of a succeeding blank in underlapping relation with the closure flap portion of a preceding blank on the face opposite the gummed face, reversing the lap of the bottom flap portion of the succeeding blank to overlap the sealing gum side of the closure flap of the preceding blank, folding the side flap portions over the body portion of the envelope blank while maintaining said lapped relation of a succeeding blank, applying adhesive to the folded over side flap portions, folding the bottom flap portion of said preceding blank over the side flap portions and effecting a seal thereof while maintaining the bottom flap portion of the succeeding blank in overlying relation with the gum of the closure flap portion of said preceding blank, creasing the gummed closure flap portion of the next preceding envelope blank that was uncovered by folding over the bottom flap portion of said preceding envelope blank, and folding said creased closure flap portion of said next preceding envelope blank to complete an envelope.

10. A method of making envelopes from blanks having side, bottom and closure flap portions extending from a body portion of the blanks, said method including moving the blanks in stepped relation one upon another, withdrawing the blanks one at a time from said stepped relation at a rate to maintain the bottom flap portion of a succeeding blank in overlapping relation with the closure flap portion of a preceding blank, folding the side flap portions over the body portion of one of the envelope blanks while maintaining said lapped relation with the preceding and succeeding blanks, applying adhesive to the folded over side flap portions, folding the bottom flap portion of said one blank over the side flap portions and effecting a seal thereof while maintaining the bottom flap portion of the succeeding blank in overlying relation with the closure flap portion of said one blank, applying gum to the closure flap portion, creasing the gummed closure flap portion, and folding said creased closure flap portion to complete an envelope while turning the envelope over for continuing movement to a place of removal.

11. A machine for making envelopes from blanks having side, bottom and closure flap portions extending from body portions of the blanks, said machine including means for supplying the blanks one upon another, upper and lower guide rails providing a pass for the blanks, means for withdrawing the blanks from the supply means one at a time and depositing them into the pass at one end thereof, disks having pins spaced apart on or about the peripheries thereof, means for supporting the disks with the pins thereon in position for propelling the blanks through the pass in spaced relation with the bottom flap portion of a succeeding blank lapping the closure flap portion of a preceding blank, means at the other end of the pass for conveying the blanks in said spaced relation, creasing rollers supported along said conveying means for creasing said side and bottom flap portions, means extending along the sides of the conveying means for folding the side flap portions, means for applying gum to the folded side flap portions, and means extending transversely at the delivery end of the conveying means for folding the bottom flap portions of the blanks over the gum on the side flaps.

12. A machine for making envelopes from blanks having side, bottom and closure flap portions extending from body portions of the blanks, said machine including means for receiving the blanks in stepped relation one upon another, upper and lower guide rails providing a pass for the blanks, means for withdrawing the blanks from the receiving means one at a time and at a rate to maintain the bottom flap portion of one blank in lapping contact with the closure flap portion of the preceding blank and depositing the blanks in said pass, means having pins spaced apart a distance substantially corresponding to the height of the finished envelope plus the height of the closure flap therefor, means for supporting the said last named means with the pins in position for propelling the blanks through the pass in spaced relation, means at the other end of the pass for conveying the blanks in said spaced relation, creasing rollers supported along said conveying means for creasing said side and bottom flap portions, means extending along the sides of the conveying means for folding the side flap portions, means for applying gum to the folded side flap portions, and means extending transversely at the delivery end of the conveying means for folding the bottom flap portions of the blanks over the gum on the side flaps.

13. A machine for making envelopes from blanks having side, bottom and closure flap portions extending from body portions of the blanks, said machine including means for supplying the blanks one upon another, upper and lower guide rails providing a pass for the blanks, means for withdrawing the blanks from the supply means one at a time and depositing them into the pass at one end thereof, disks having spaced apart pins on the peripheries thereof, means for supporting the disks with the pins thereon in position for propelling the blanks through the pass in spaced relation with the bottom flap portion of a succeeding blank lapping the closure flap portion of a preceding blank, means at the other end of the pass for conveying the blanks in said spaced relation, creasing rollers supported along said conveying means for creasing said side and bottom flap portions, a second conveying means in alignment with the first named conveying means, a feed roller at the delivery end of the first conveying means for discharging the blanks after creasing of the side flaps onto the second conveying means at a higher speed to separate the endmost blank on the first named conveying means from the succeeding blank, means for deflecting the closure flap portion of the speeded blank below the path of the following blank when discharged from the first conveyor whereby the bottom flap portion thereof slides over the closure flap portion of the preceding blank, means extending along the sides of the second conveying means for folding the side flap portions, means for applying gum to the folded side flap portions, and means extending transversely at the delivery end of the second conveying means for folding the bottom flap portions of the blanks over the gum on the side flaps.

14. A machine for making envelopes from blanks having side, bottom and closure flap portions extending from body portions of the blanks, said machine including means for receiving the blanks in stepped relation one upon another, upper and lower guide rails providing a pass for the blanks, means for withdrawing the blanks from the receiving means one at a time and at a rate to maintain the bottom flap portion of one blank in lapping contact with the closure flap portion of the preceding blank and depositing the blanks in said pass, means having pins spaced apart a distance substantially corresponding to the height of the finished envelope plus the height of the closure flap therefor, means for supporting the said last named means with the pins in position for propelling the blanks through the pass in substantially the same spaced relation as the pins, means at the other end of the pass for conveying the blanks in said spaced relation, creasing rollers supported along said conveying means for creasing said side and bottom flap portions, a second conveying means in alignment with the first named conveying means, a feed roller at the delivery end of the first conveying means for discharging the blanks after creasing of said flaps onto the second conveying means at a higher speed to separate the endmost blank on the first named conveying means from the succeeding blank, means for deflecting the closure flap portion of the speeded blank below the path of the following blank when discharged from the first conveyor whereby the bottom flap portion thereof slides over the closure flap portion of the preceding blank, means extending along the sides of the second conveying means for folding the side flap portions, means for applying gum to the folded side flap portions, and means extending transversely at the delivery end of the second conveying means for folding the bottom flap portions of the blanks over the gum on the side flap portions.

15. A machine for making envelopes from blanks having side, bottom and closure flap portions extending from body portions of the blanks, said machine including means for receiving the blanks, means for providing a pass for the blanks, means for withdrawing the blanks from the receiving means one at a time and depositing the blanks in said pass, disks having pins projecting from the peripheries and spaced apart a distance substantially corresponding to the desired feed of the blanks to maintain the bottom flap portion of one blank in lapping contact with the closure flap portion of the preceding blank, means for supporting the disks with the pins in position for propelling the blanks through the pass in said spaced relation, a conveyor means at the other end of the pass for conveying the blanks in said spaced relation, creasing rollers supported along said conveyor means for creasing said side and bottom flap portions, means extending along the sides of the conveyor means for folding the side flap portions, means for applying gum to the folded side flap portions, means extending transversely at the delivery end of the conveyor means for folding the bottom flap portions of the blanks over the gum on the side flaps, means for continuing the advancement of the blanks, means for registering and scoring the closure flaps, and means for folding the closure flaps on said crease and inverting the envelopes.

16. A machine for making envelopes from blanks having side, bottom and closure flap portions extending from a body portion of the blanks, with the closure flap portions pregummed, said machine including means for receiving the blanks in stepped relation one upon another with the gum on the closure flap portions exposed by the stepped relation of the blanks, means for withdrawing the blanks from the receiving means one at a time and at a rate to maintain the bottom flap portion of a succeeding blank in underlapping relation with the closure flap portion of a preceding blank, means for reversing the lap of the bottom flap portion of a succeeding blank to overlap the gum on the closure flap portion of a preceding blank, means for conveying the blanks from the lap reversing means, means extending along opposite sides of the conveying means for holding the side flap portions of the blanks after reversal of the overlap, means in the path of the blanks carried by the conveying means for applying adhesive to the folded-over side flap portions, and a second folding means supported transversely of the conveying means for folding the bottom flap portion of the preceding blank over the side flap portions for effecting a seal thereof while maintaining the bottom flap portion of the succeeding blank in said overlying relation with the gum on the closure flap portion.

17. A machine for making envelopes from blanks having side, bottom and closure flap portions extending from a body portion of the blanks, with the closure flap portions pregummed, said machine including means for receiving the blanks in stepped relation one upon another with the gum on the closure flap portions exposed by the stepped relation of the blanks, means for withdrawing the blanks from the receiving means one at a time and at a rate to maintain the bottom flap portion of a succeeding blank in underlapping relation with the closure flap portion of a preceding blank, means for spacing and registering the blanks in said lapped relation, means for creasing the side and bottom flap portions of a preceding blank, means for reversing the lap of the bottom flap portion of a succeeding blank to overlap the gum on the closure flap portion of a preceding blank, means for conveying the blanks from the lap reversing means, means extending along opposite sides of the conveying means for folding the side flap portions of the blanks after reversal of the overlap, means in the path of the blanks carried by the conveying means for applying adhesive to the folded-over side flap portions, and a second folding means supported transversely of the conveying means for folding the bottom flap portions of the preceding blank over the side flap portions for effecting a seal thereof while maintaining the bottom flap portion of the succeeding blank in said overlying relation with the gum on the closure flap portion.

18. A machine for making envelopes from blanks having side, bottom and closure flap portions extending from a body portion of the blanks, with the closure flap portions pregummed, said machine including means for receiving the blanks in stepped relation one upon another with the gum on the closure flap portions exposed by the stepped relation of the blanks, means for withdrawing the blanks from the receiving means one at a time and at a rate to maintain the bottom flap portion of a succeeding blank in underlapping relation with the closure flap portion of a preceding blank, means for reversing the lap of the bottom flap portion of a succeeding blank to overlap the gum on the closure flap portion of a preceding blank, means for conveying the blanks from said reversing means, means extending along opposite sides of the conveying means for folding the side flap portions of the blanks after reversal of the overlap, means in the path of the blanks carried by the conveying means for applying adhesive to the folded-over side flap portions, a second folding means supported transversely of the conveying means for folding the bottom flap portion of the preceding blank over the side flap portions for effecting a seal thereof while maintaining the bottom flap portion of the succeeding blank in said overlying relation with the gum on the closure flap portion, and means at the discharge end of the conveying means for folding the closure flap and inverting the envelopes.

19. A method of making envelopes from blanks having one face side to constitute the inside faces of the completed envelopes and having side, bottom and closure flap portions extending from a body portion of the blanks and said bottom and side flap portions having related marginal portions to be sealed one to the other, said method including moving the blanks one upon another with said one face side uppermost and with the bottom flap portion of a suceeding blank in overlapping relation with the closure flap portion on the inside face of a preceding blank, folding the side flap portions of the said preceding blank over the body portion of the said preceding blank while maintaining said overlapped relation of said succeeding blank, applying adhesive to one of each related marginal portions of the said preceding blank, folding the bottom flap portion of the said preceding blank over the side flap portions thereof for effecting a seal by said adhesive while maintaining the bottom flap portion of the succeeding blank in overlying relation with the closure of the said preceding blank and to uncover the closure flap of the next preceding blank, and folding the closure flap portion of the said next preceding blank.

20. A method of making envelopes from blanks having one face side to constitute the inside faces of the completed envelopes and having side, bottom and pregummed closure flap portions extending from a body portion of the blanks with the gum of the closure flap on said one face side of the blanks, said method including moving the blanks in stepped relation one upon another, withdrawing the blanks one at a time from said stepped relation at a rate to maintain the bottom flap portion of a succeeding blank in underlapping relation with the closure flap portion of a preceding blank on the face opposite the gum on the closure flap portion, reversing the lap of the bottom flap portion of the succeeding blank to overlap the sealing gum side of the closure flap portion of the preceding blank, folding the side flap portions over the body portion of said preceding envelope blank while maintaining said lapped relation of a succeeding blank, applying adhesive to the blank for subsequently sealing the bottom flap portion to the folded over side flap portions, folding the bottom flap portion of said preceding blank over the side flap portions thereof for effecting said seal of the bottom to the side flap portions by said adhesive while maintaining the bottom flap portion of the succeeding blank in overlying relation with the gum of the closure flap portion of said preceding blank, creasing the gummed closure flap portion to complete an envelope, and folding said creased closure flap portion of the said next preceding envelope blank that was uncovered by folding over of the bottom flap portion of the said preceding envelope blank.

21. A machine for making envelopes from blanks having side, bottom and closure flap portions extending from a body portion of the blanks and said side and bottom flap portions having side marginal portions, said machine including means for conveying the blanks in consecutive order with the bottom flap portions leading and the closure flap portions trailing, a second conveying means operating at a slower speed for conveying the blanks, means between said conveying means for momentarily depressing the trailing closure flap portions of the blanks downwardly as the blanks pass from the faster conveying means to the slower conveying means to effect overlap of the bottom flap portions of the succeeding blank with the closure flap portion of a preceding blank, means extending along opposite sides of said slower conveying means for folding the side flap portions of the blanks over the body portions on opposite sides of the overlapping bottom flap portions, rotary gum applying means operating at the speed of said slower conveying means for applying gum to one of said marginal portions, and means for folding the bottom flap portion of a preceding blank over the folded side flap portions to bring the marginal portions of the bottom flap portions into sealing contact with the marginal portions of the side flap portions and to uncover the trailing closure flap portion of the next preceding blank.

22. A machine for making envelopes from blanks having side, bottom and closure flap portions extending from a body portion of the blanks and said side and bottom flap portions having side marginal portions, said machine including means for conveying the blanks in consecutive order with the bottom flap portions leading and the closure flap portions trailing, a second conveying means operating at a slower speed for conveying the blanks, means between said conveying means for momentarily depressing the trailing closure flap portions of the blanks downwardly as the blanks pass from the faster conveying means to the slower conveying means to effect overlap of the bottom flap portions of the succeeding blank with the closure flap portion of a preceding blank, means extending along opposite sides of said slower conveying means for folding the side flap portions of the blanks over the body portions on opposite sides of the overlapping bottom flap portions, rotary gum applying means operating at the speed of said slower conveying means for applying gum to one of said marginal portions, means for folding the bottom flop portion of a preceding blank over the folded side flap portions to bring the marginal portions of the bottom flap portions into sealing contact with the marginal portions of the side flap portions and to uncover the trailing closure flap portion of the next preceding blank, conveying means operating at a slower speed than the second conveying means for receiving thereon the preceding folded blank, and means for depressing the trailing closure flap portion of the folded blank for causing the suceeding folded blank to pass in overlapping relation with the said preceding folded blank.

References Cited in the file of this patent
UNITED STATES PATENTS

| | | |
|---|---|---|
| 2,791,161 | Doetsch | May 7, 1957 |
| 2,811,905 | Kennedy | Nov. 5, 1957 |